United States Patent [19]
Jackson

[11] 3,855,838
[45] Dec. 24, 1974

[54] APPARATUS FOR FORMING VARIABLE LENGTH CABLE OFFSETS

[75] Inventor: Richard L. Jackson, Lewisburg, Ohio

[73] Assignee: Jackson Communications Corporation, Clayton, Ohio

[22] Filed: Oct. 1, 1973

[21] Appl. No.: 402,358

[52] U.S. Cl. .................. 72/389, 72/458, 72/705, 140/123
[51] Int. Cl. ............................................ B21d 9/05
[58] Field of Search ............. 72/389, 380, 381, 386, 72/705, 461, 460, 300, 301, 457, 458, 459; 140/123

[56] References Cited
UNITED STATES PATENTS
2,740,435  4/1956  Pritts .................................. 72/386
3,507,141  4/1970  Fisher .................................. 72/389
3,531,972  10/1970  Smith .................................. 72/389
3,691,815  9/1972  Deacon ............................... 72/458

Primary Examiner—C. W. Lanham
Assistant Examiner—Gene P. Crosby
Attorney, Agent, or Firm—Biebel, French & Bugg

[57] ABSTRACT

Apparatus for forming an expansion loop in a cable, such as a coaxial cable, to accommodate expansion and contraction of the cable caused by temperature changes. The apparatus forms an expansion loop which consists of an offset section which is substantially straight and parallel to the body of the cable and the length of the offset can be varied through adjustments to the apparatus to suit different cable sizes and expected temperature ranges.

10 Claims, 10 Drawing Figures

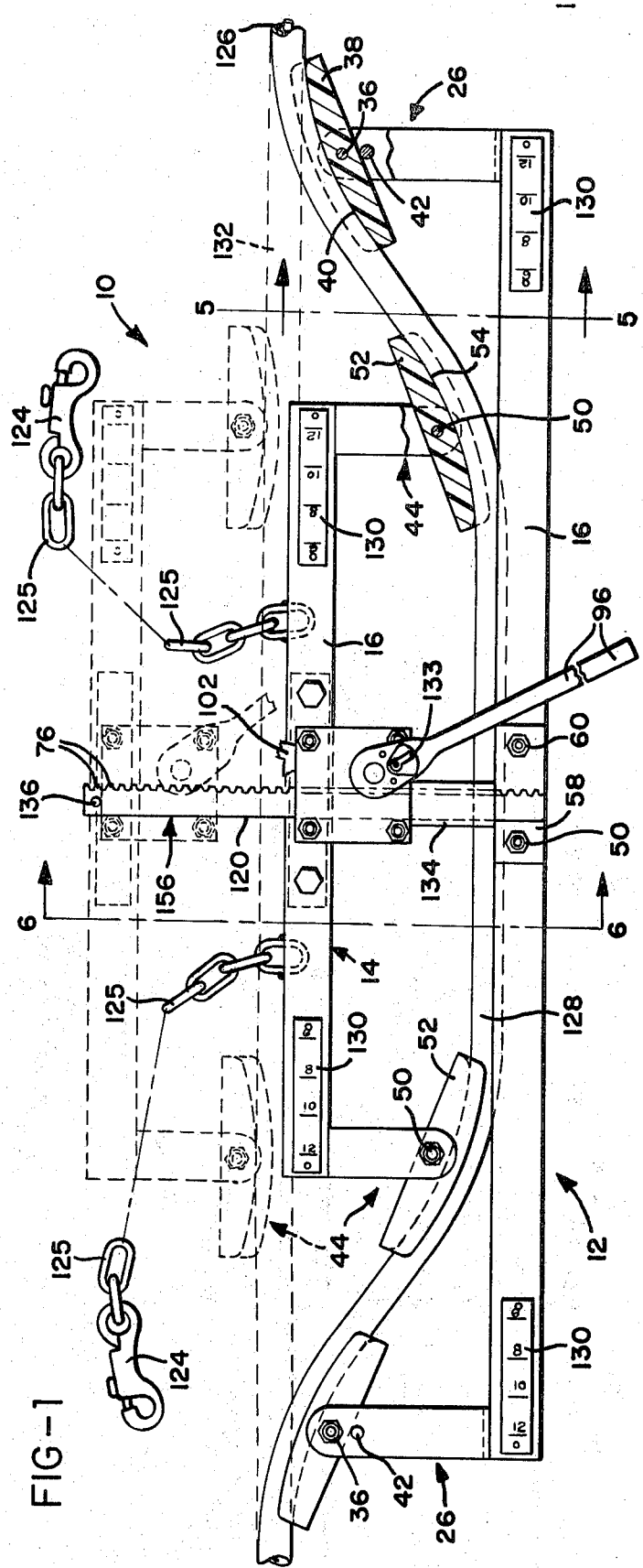
FIG-1
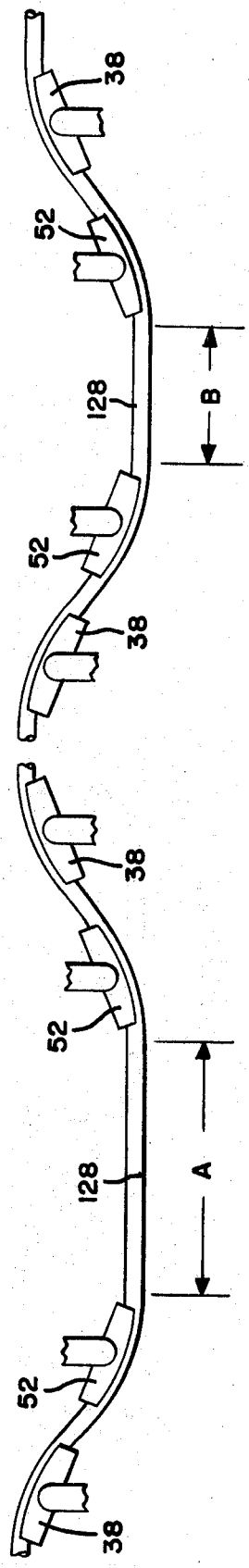
FIG-2
FIG-3

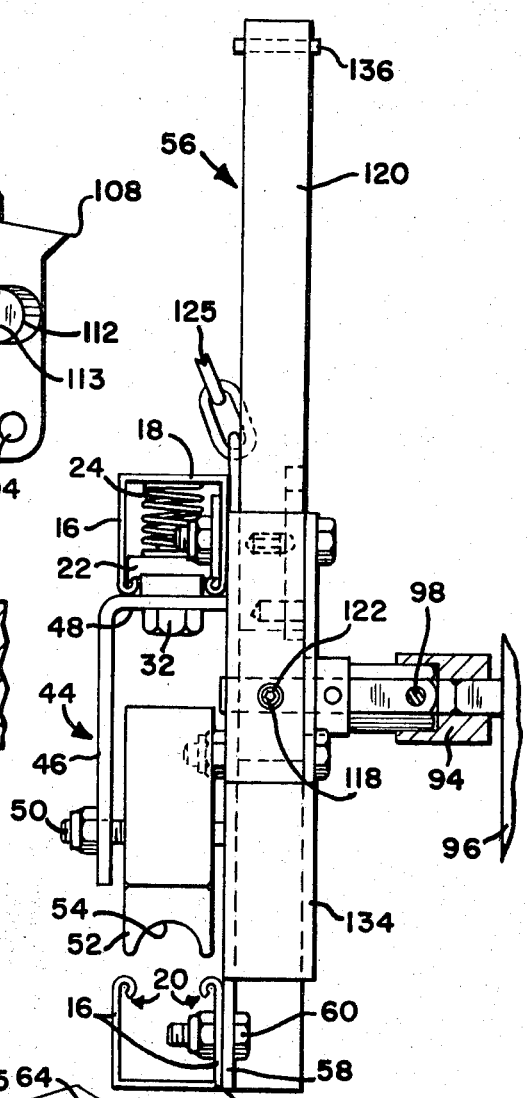

APPARATUS FOR FORMING VARIABLE LENGTH CABLE OFFSETS

CROSS REFERENCE TO RELATED APPLICATION

CABLE BENDER, Ser. No. 311,470, filed Dec. 4, 1972.

BACKGROUND OF THE INVENTION

The above noted related application discloses apparatus for forming expansion loops in cables, such as relatively stiff and fragile coaxial cables. As noted therein, the forming of such loops in coaxial cables presents problems which appear to be particularly associated with cables of this type. For example, the cable is relatively stiff so that the bending apparatus must possess sufficient rigidity to impart bends in the cable being worked upon. However, the cable is also relatively fragile and readily susceptible to damage so that extreme care must be exercised in forming bends in the cable.

Additionally, since expansion loops are usually formed in cable which is already in place beneath an existing messenger strand, the apparatus must be relatively light in weight to permit it to be handled conveniently by a workman positioned several feet in the air beneath the messenger strand.

Further, the apparatus should be capable of engaging the cable from the side, since a cable end will usually not be accessible to position the cable bender thereon.

The above noted application has been found to work satisfactorily with regard to the problems discussed above. However, it has been found that, particularly where the cable will be subjected to extremes in temperature, the most desirable type of expansion loop is one which includes a well defined, substantially straight, offset section joined to the main body of the cable by gently curved interconnecting sections.

Additionally it is desirable to be able to adjust the length of the substantially straight offset section for particular sizes of cables and the temperature conditions expected to be encountered. While the apparatus of the above noted, related application performs satisfactorily with regard to most of the problems discussed above, it does not possess the capabilities of permitting a substantially straight offset section to be formed in a cable with the length of the offset section varied as desired within predetermined limits.

SUMMARY OF THE INVENTION

The present invention provides apparatus for forming an expansion loop in a relatively stiff cable, such as a coaxial cable, with the loop including a relatively straight offset section of desired length extending substantially parallel to the body of the cable.

The apparatus includes a base frame carrying cable engaging shoes and a center frame positioned in opposition to the base frame and also carrying cable engaging shoes having cable engaging surfaces disposed oppositely to the cable engaging surfaces of the shoes carried by the base frame. The shoes carried by the center frame are spaced apart from each other to provide the substantially straight offset section of the expansion loop and the spacing between the shoes may be varied to vary the length of the offset section.

To insure that the offset section of the expansion loop is connected to the main body of the cable by gently curved, interconnecting portions, regardless of the spacing between the shoes on the center frame, the spacing between the shoes carried by the base frame is also adjustable and all of the shoes are rotatably mounted to permit a conformation of the shoes to the curvature of the cable outwardly of the offset section.

The center and main frames are drawn toward each other with a cable positioned therebetween by a rack and pinion, with the pinion carried in a housing which also pivotally mounts a pawl engageable with a toothed surface of the rack. The pawl is manually operable and may be flipped between positions in engagement with the toothed edge of the rack and disengaged therefrom, with biasing means insuring that the pawl is either fully engaged or fully disengaged.

To provide a smoothly operating mechanism and to resist movement along the rack when the pawl is not in engagement therewith, inserts of a material such as Teflon are carried by the pinion housing and crushed into engagement with a smooth edge of the rack by means of set screws or the like.

Additionally, suspension hooks may be provided, on the center frame for example, to allow the apparatus to be suspended from a messenger strand, thereby leaving the operator's hands free to position a cable within the apparatus while working at a height above the ground.

BRIEF DESCRIPTION OF THE DRAWINGS

FIG. 1 is a side view of the apparatus of the present invention with the open position indicated in dashed lines and the closed position indicated in solid lines;

FIG 2 illustrates a relatively long offset formed in a cable with the apparatus of the present invention;

FIG. 3 is a view similar to FIG. 2 but showing an offset of substantially shorter length than that shown in FIG. 2;

FIG. 4 is a cross sectional view taken on line 4—4 of FIG. 5;

FIG. 5 is a cross sectional view taken on line 5—5 of FIG. 1, but with the cable omitted for purposes of clarity;

FIG. 6 is a view taken on line 6—6 of FIG. 1 but again with the cable omitted for purposes of clarity;

FIG. 7 is a view of one side of a pawl;

FIG. 8 is a cross sectional view through a portion of the gear box of the present invention showing the bias means for the pawl;

FIG. 9 is a cross section view similar to FIG. 7, and showing a modified form of structure from that of FIG. 4, and FIG. 10 is an exploded perspective view showing the various components associated with the gear box.

DESCRIPTION OF THE PREFERRED EMBODIMENT

Turning initially to FIG. 1 of the drawings, it will be seen that the apparatus 10 of the present invention includes a base frame 12 and a center frame 14. Both the base and center frames, as best seen in FIGS. 4 through 6 of the drawings, are of channel shape and include side walls 16 and an interconnecting wall 18.

The free edges of the side walls 16 are turned inwardly, as at 20, and nuts 22 received within the base and center frames have slotted portions along their edges, preferably knurled, which engage the inwardly turned edges of the side wall 16. A spring 24 is associated with each nut 22 and urges the nut into engagement with the inwardly turned edges 20.

Mounted on the edges of the side walls 16 of the base frame 12 are outer, substantially U-shaped shoe supporting brackets 26, each of which includes outwardly projecting legs 28 interconnected by a web 30. The webs 30 of the brackets 26 are suitably apertured to receive a bolt 32 in threaded engagement with a nut 22. Thus, the brackets 26 may be positioned at various points along the base frame 12 by loosening the bolt 32 and sliding the bracket along the upper edges of the side walls 16. To maintain the legs 28 substantially aligned with the side walls 16 aligning means are provided extending from the web 30 between and in engagement with the edges 20 of the side wall 16. Such means may take the form of a tab 34, FIGS. 4 and 5, or a pair of split pins 35, FIG. 9, extending from the web 30.

Adjacent their upper ends the legs 28 are provided with a through bolt 36 which rotatably mounts a cable shoe 38 having a grooved, cable engaging surface 40. A cross pin 42 also extends between the legs 28, but below the cross bolt 36. The pin 42 serves as a stop member to limit rotation of the shoes 38, so that their cable engaging surfaces are always facing toward the center frame.

The center frame 14 carries inner shoe supporting brackets 44 each of which includes a pair of spaced apart legs 46 joined by an interconnecting web 48. Similarly to the web 30, the web 48 is suitably apertured to receive a bolt 32 which engages a nut 22. Thus, the inner shoe brackets are also adjustable along the length of the center frame 14 in the same manner described above with respect to the base frame 12, and preferably each inner shoe is also provided with a tab similar to the tab 34.

The legs 46 are provided with a through bolt 50 which rotatably mounts an inner cable shoe 52 having a grooved, cable engaging surface 54 facing the base frame 12. It is unnecessary to provide te inner brackets 44 with stop means, as at 42 on the outer brackets 26, since the length of the shoes 52 with respect to the length of the legs 46 is such that the shoes 52 are prevented from rotating completely around to a point where they are facing away from the base frame 12.

A rack 56, as seen in FIGS. 1, 6 and 9 of the drawings, is welded to a plate 58 at the lower end of the rack and the plate is bolted, as at 60, to a side wall 16 of the base frame 12. A gear box 62, as seen in FIG. 9 of the drawings, is provided with a slotted portion 64 which receives the rack 56. A cover plate 66 is attached to the gear box 62 by means of lower bolts 68 and to the gear box and a side wall 16 of the center frame 14 by means of upper bolts 70.

The gear box 62 is also provided with a hollowed out portion 72 which rotatably receives a pinion 74. Pinion 74 is in engagement with the teeth 76 of the rack 56 and the hub 78 of the pinion 74 extends through an opening 80 in the cover plate 66 to provide a bearing for the pinion at that point. A shaft 82 extends through the pinion 74 and is pinned thereto by means of the pin 84 and the end 86 of the shaft extends through the opening 88 in the gear box to provide a bearing at that point for the pinion 74.

The shaft 82 at its opposite end 90 is of hexagonal configuration and is provided with an opening 92 therethrough. Thus, a hexagonal socket wrench 94 (FIG. 6) permanently attached to a ratchet handle 96 may be pinned to the hexagonal end 90 of the shaft 82 by means of a pin 98. Thus, reciprocating movement of the ratchet handle 96 will result in the pinion moving along the rack 56, either moving the frames 12 and 14 towards or away from each other.

It will also be noted from FIG. 9 of the drawings that a relieved portion 100 is formed in the gear box 62 and a pawl 102 is rotatably mounted therein adjacent its lower end by means of a pin, not shown, passing through an opening 104 in the pawl and an opening 106 in the gear box. The pawl, as also seen in FIG. 7, is provided with a tooth engaging portion 108 which can be moved into and out of engagement with the teeth 76 of the rack 56 by engaging manually the knurled upper edge 110 of the pawl and flipping it about its lower pivotal connection to the gear box 62.

A slot 111 is formed in a surface of the pawl facing the gear box 62 with each end of the arcuate slot being depressed, as indicated at 112 in FIGS. 7 and 9 of the drawings and separated by a crest 113. A spring loaded plunger 114 is received in an opening 116 in the gear box 62 and rides in the slot 111 formed in the pawl 102. Thus with the opposite ends of the slot depressed as at 112 the pawl tends to be biased into a fully disengaged position or a position fully engaged with the teeth 76 of the rack 56.

The gear box 62 is also provided, as best seen in FIGS. 6 and 9 of the draings, with an opening 118 which receives a plug 119 of a suitable material such as Teflon, which is crushed into engagement with the untoothed edge 120 of the rack 56 by means of a set screw or the like 122. This provides a frictional engagement between the gear box 62 and the rack 56 and also enhances the smooth operation of the rack and pinion system.

In operation, snap hooks 124 carried by chains 125 attached to the center frame 14 are engaged on a messenger strand (not shown) beneath which a cable 126 is to be strung. This then leaves the operator's hands free to position the cable 126 between the opposite cable engaging surfaces of the shoes 38 and 52, the center frame being disposed with respect to the base frame at this time as indicated by dashed lines in FIG. 1 of the drawings.

Prior to this, the inner and outer brackets 44 and 26 will have been adjusted along their respective frames to position them at the desired spacing to produce an offset section, as at 128, of the desired length. To facilitate adjustment of the inner and outer brackets, plates 130 may be attached to the base and center frames carrying suitable indicia to indicate the positioning of the brackets necessary to obtain an offset section of the desired length. For purposes of illustration the indicia are given as 6 inches, 8 inches, 10 inches and 12 inches, although it will be apparent that the indicia will be determined by the range of values for the offset desired.

After the apparatus has been positioned on the generally straight section of cable, as indicated in dashed lines at 132 in FIG. 1 of the drawings, the switch 133 on the ratchet handle 96 is flipped to the appropriate position and the ratchet reciprocated to drive the pinion 74 along the rack 56, moving the center frame toward the base frame and forming the substantially straight offset section 128 in the cable extending generally parallel to the main body of the cable.

Before the center frame is moved towards the base frame 12 to form the offset section in the cable, the pawl 102 is biased into engagement with the toothed edge 76 of the rack 56 to prevent retrograde movement of the pinion along the rack. However, when the offset has been formed, the pawl may be flipped to the position shown in FIG. 1 of the drawings to allow the center frame 14 to be moved away from he base frame 12.

As can be seen in FIGS. 2 and 3 of the drawings, the length of the offset 128 may be varied considerably depending upon the particular range of temperatures to be encountered and the size of the cable being worked upon, or even on the personal preference of engineering personnel designing the system. In FIG. 2, for example, the offset may be approximately 12 inches in length, as indicated by the dimenson A, or it may be much smaller, say 6 inches in length, as indicated by the dimension B in FIG. 3 of the drawings.

Generally it will be desirable to provide a sleeve 134 which is received on the rack 56, as seen in FIGS. 1 and 6 of the drawings, to limit the extent to which the center frame 14 may approach the base frame 12. It will be apparent, however, that if a sharper bend is desired the center frame 14 may be removed from the rack 56 by first removing the retaining pin 136 from the upper end of the rack and then sliding the sleeve off the rack 56.

From the above it will be seen that the present invention provides apparatus for forming substantially straight offset sections in a cable extending generally parallel to the body of the cable and with the length of the offsets being adjustable to suit various conditions.

While the form of apparatus herein described constitutes a preferred embodiment of the invention, it is to be understood that the invention is not limited to this precise form of apparatus, and that changes may be made therein without departing from the scope of the invention.

What is claimed is:

1. Apparatus for forming in a cable an expansion loop consisting of a substantially straight section offset from and generally parallel to the main body of the cable and joined thereto by gently curved interconnecting portions comprising:
   a. a base frame including a central portion and spaced, outwardly projecting outer shoe supports,
   b. a center frame including a central portion and outwardly projecting inner shoe supports spaced from each other along said center frame,
   c. means mounting said center frame in opposed relationship to said central portion of said base frame,
   d. cable engaging shoes,
   e. means for rotatably mounting said shoes on said outer and inner shoe supports of said base and center frames with cable engaging surfaces of said shoes on said center frame disposed in opposition to cable engaging surfaces on said shoes mounted on said base frame, and
   f. means for moving said base and center frames toward each other with a cable engaged by said opposed cable engaging surfaces on said shoes to form said substantially straight offset section in said cable at that portion thereof between said inner shoe supports.

2. The apparatus of claim 1 further comprising:
   a. means for adjusting the spacing between said outwardly projecting outer shoe supports along said base frame.

3. The apparatus of claim 1 further comprising:
   a. means for adjusting the spacing between said outwardly projecting inner shoe supports along said center frame.

4. The apparatus of claim 3 further comprising:
   a. means for adjusting the spacing between said outwardly projecting outer shoe supports along said base frame.

5. The apparatus of claim 1 wherein:
   a. said base frame is of substantially channel shaped cross sectional configuratin including side walls and an interconnecting wall extending between said side walls,
   b. said shoe supports are mounted on edges of said side walls opposite said interconnecting wall, and
   c. portions of said shoe supports project inwardly between and engage portions of said side walls to maintain said shoe supports in alignment on said base frame.

6. The apparatus of claim 1 wherein said means for moving said base and center frames toward each other comprising:
   a. rack means having a toothed edge extending from one of said frames,
   b. pinion means carried by the other of said frames and engaging said toothed edges of said rack means, and
   c. means for rotating said pinion to move said pinion and the frame on which it is mounted along said rack means.

7. The apparatus of claim 6 further comprising:
   a. pawl means pivotally carried by said other frame and engageable with said toothed edge of said rack means, and
   b. means for biasing said pawl means into alternate positions fully engaged with said toothed edge of said rack means and fully disengaged therebetween.

8. The apparatus of claim 6 further comprising:
   a. means carried by said other frame for frictionally engaging an untoothed surface of said rack means.

9. The apparatus of claim 1 further comprising:
   a. means for suspending said apparatus from a messenger strand.

10. Apparatus for forming in a cable an expansion loop consisting of a substantially straight section offset from and generally parallel to the main body of the cable and joined thereto by gently curved interconnecting portions comprising:
    a. an elongated, substantially channel shaped base frame having side walls, an interconnecting wall interconnecting said side walls along one edge thereof, and inwardly turned portions on opposite edges thereof,
    b. a pair of substantially U-shaped outer shoe supporting brackets having outwardly projecting legs and a web joining said legs,
    c. means adjustably mounting said outer brackets on said opposite edges of said side walls of said base frame and permitting movement of said brackets along the length of said base frame, d. tabs extending from said webs of said outer brackets between and in engagement with said inwardly turned edges of said side walls of said base frame, e. cable engaging shoes having a grooved cable engaging surfaces formed therein facing away from said base frame and rotatably mounted between said outwardly projecting legs of said outer brackets, f. means associated with each of said outer brackets for limiting rotational movement of said cable engaging shoes with respect to said brackets and preventing said cable engaging surfaces from facing said base frame, g. a center frame of substantially channel shaped cross sectional configuration including a pair of side walls, an interconnecting wall, and inwardly turned free edges on said side walls projecting toward said interconnecting wall, h. a pair of inner shoe supporting brackets each including spaced legs and a web interconnecting said legs, i. said inner brackets being mounted on said free edges of said side walls of said center frame with said legs projecting away from said center frame, j. means on said webs of said inner brackets projecting between and in engagement with said inwardly turned free edges of said center frame, k. a pair of center frame shoes having cable engaging surfaces facing away from said center frame, l. means rotatably mounting said center frame shoes between said legs of said inner brackets, m. a rack fixed to said base frame adjacent the center thereof and projecting substantially perpendicularly therefrom, n. a gear box mounted on said center frame adjacent the center thereof, o. a pinion rotatably mount in said gear box and engaging a toothed edge of said rack, p. a pawl pivotally mounted in said gear box and biased for movement into alternate positions in full engagement with said toothed edge of said rack and fully disengaged from said toothed edge of said rack, q. a plug of polymeric carried by said gear box and forced into frictional engagement with an untoothed edge of said rack opposite said toothed edge thereof, r. means carried by said center frame for suspending said apparatus from a messenger strand, and s. a spacing sleeve received on said rack intermediate said base frame and said gear box mounted on said center frame.

* * * * *